United States Patent
Mickos et al.

(10) Patent No.: US 7,342,905 B1
(45) Date of Patent: Mar. 11, 2008

(54) COMMUNICATIONS SYSTEM

(75) Inventors: Roy Mickos, Tampere (FI); Pekka Rissanen, Tampere (FI); Peeter Pruuden, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/557,999

(22) Filed: Apr. 24, 2000

(30) Foreign Application Priority Data

Apr. 30, 1999 (GB) .................................. 9910152.9

(51) Int. Cl.
*H04Q 7/24* (2006.01)

(52) U.S. Cl. ...................................... 370/338; 370/349

(58) Field of Classification Search ................ 370/285, 370/331, 310, 312, 310.2, 410, 402, 465, 370/466, 401, 395.31, 328, 338, 349, 352–358, 370/395.51; 455/432, 433, 435, 436, 439, 455/440, 432.1, 435.1
See application file for complete search history.

(56) References Cited

U.S. PATENT DOCUMENTS

| | | | | |
|---|---|---|---|---|
| 5,915,087 | A * | 6/1999 | Hammond et al. | 395/187.01 |
| 5,943,399 | A * | 8/1999 | Bannister et al. | 455/414 |
| 5,999,813 | A * | 12/1999 | Lu et al. | 455/435 |
| 6,044,269 | A * | 3/2000 | Talagery | 455/433 |
| 6,314,284 | B1 * | 11/2001 | Patel et al. | 455/417 |
| 6,424,638 | B1 * | 7/2002 | Ray et al. | 370/331 |
| 6,507,589 | B1 * | 1/2003 | Ramasubramani et al. | 370/465 |
| 6,519,235 | B1 * | 2/2003 | Kim et al. | 370/331 |
| 6,539,237 | B1 * | 3/2003 | Sayers et al. | |
| 6,888,803 | B1 * | 5/2005 | Gentry et al. | 370/259 |

FOREIGN PATENT DOCUMENTS

| | | |
|---|---|---|
| EP | 0 766 490 A2 | 2/1997 |
| EP | 0923258 A2 | 6/1999 |
| WO | 99/05590 | 2/1999 |

OTHER PUBLICATIONS

"H.323: The Multimedia Communications Standard for Local Area Networks" Thom, et al. XP 00636454.
"H.323: The Multimedia Communications Standard for Local Area Networks" Thom, et al. XP 00636454.

* cited by examiner

*Primary Examiner*—Brenda Pham
(74) *Attorney, Agent, or Firm*—Squire, Sanders & Dempsey L.L.P.

(57) ABSTRACT

A communications system includes a subnetwork connected to a network. The network has a first part and a second part, with the first and second parts being connected so that a first user can communicate with a second user. The first user is able to move within the respective part of the system. The subsystem includes a gateway for permitting communications between first and second parts. The gateway includes a register for storing information associating the first and second users, and for storing information relating to the current location of the first user so that information from the second user can be directed to the first user.

19 Claims, 3 Drawing Sheets

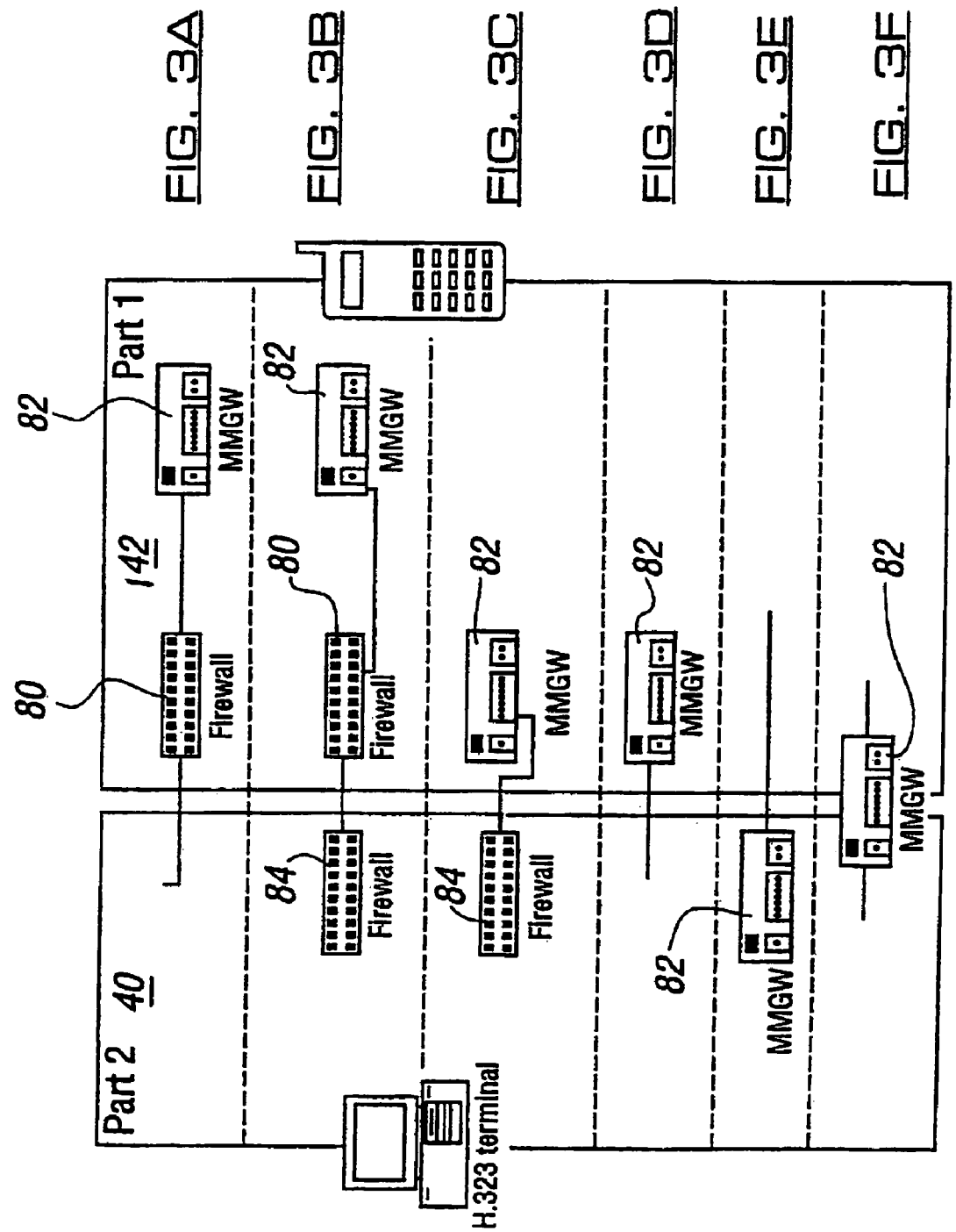

COMMUNICATIONS SYSTEM

BACKGROUND OF THE INVENTION

1. Field of the Invention

The present invention relates to a communications system and in particular, but not exclusively, to one having two domains or segments.

2. Description of the Related Art

Known office based communication systems usually operate with fixed line telephone units within the office linked via an internal switch board or PBX (private branch exchange). Such fixed line systems are able to provide relatively high voice quality although users are not able to move for the duration of a call.

The advent of wireless cellular telecommunication technologies, an example of which is the GSM standard (Global System for Mobile communications) means that wireless systems can provide at least the equivalent voice quality as compared to fixed line systems. Wireless cellular systems also have the advantage that the user can move.

WIO "wireless intranet office" is a proprietary communication system which is being developed by the present applicants. This WIO system introduces the concept of utilizing mobile terminals, such as conventional GSM mobile stations, in an office environment. The system makes use of a known concept called internet telephony or voice-over-IP. (IP stands for internet protocol.)

Voice-over-IP allows audio, video and data information to be transmitted over the existing IP-based local or wide area networks or the Internet. The technology thus provides for convergence and integration of the communication of three different data types over the same network.

Prior to the introduction of voice-over-IP, offices often operated three separate networks for the transmission of audio, video and data information. Fixed line telephone systems coupled to an in-house PBX provided voice communication. An office based local area network (LAN) or intranet (i.e. a packet switched internal network) having computer terminals linked via network cards and under the control of a server station provided for the transmission of "conventional" computer data. Video cameras linked to monitors via a fixed line or wireless link provided for video communications. With voice-over-IP, audio, video and data information can be transmitted simultaneously using the same packet-switched network or IP-router throughout the office environment and beyond the confines of the office.

In order to provide for such media convergence, voice-over-IP often uses a specific ITU (International Telecommunication Union) standard protocol to control the information flow over the intranet. One common standard protocol used in voice-over-IP systems, and the one used in the WIO system is termed H.323. H.323 is an ITU standard for multimedia communications (for example voice, video and data) and allows multimedia streaming over conventional packet-switched networks. The protocol provides for call control, multi media management and bandwidth management for both point-to-point (two end users in communication) and multipoint (three or more end users in communication) conferences.

The H.323 protocol is network, platform and application independent allowing any H.323 compliant terminal to operate in conjunction with any other H.323 terminal.

The H.323 standard defines the use of three further command and control protocols. H.245 is for call control and is responsible for control messages governing the operation of the H.323 terminal including capability exchanges, commands and indications. Q.931 is for call signalling and is used to set up a connection between two terminals. The RAS (Registrations, Admissions and Status) signalling function governs registration, admission and bandwidth functions between endpoints and gatekeepers. Gatekeepers will be discussed in more detail hereinafter.

For a H.323 based communication system, the standard defines four major components: terminals; gateways; gatekeepers; and multipoint control units (MCU).

Terminals are the user end-points on the network and can be a fixed telephone, a fax unit or a computer terminal. All H.323 compliant terminals must support voice communications and optionally video and data communications.

Gateways connect H.323 networks to other networks or protocols. For an entirely internal communications network, i.e. one with no external call facility, gateways are not required.

Gatekeepers are the control centers of the voice-over-IP network. It is under the control of a gatekeeper that most transactions (communication between two terminals) are established. The primary functions of the gatekeeper are bandwidth management call control controlling the number of simultaneous H.323 connections and controlling the amount of bandwidth these calls consume. An H.323 "zone" is defined as a collection of all terminals, gateways and multipoint-control units (MCU) which are managed by a single gatekeeper. Multipoint control units (MCU) support communications between three or more terminals. The MCU comprises a multipoint controller (MC) which performs H.245 negotiations between all terminals to determine common audio and video processing capabilities, and a multipoint processor (MP) which routes audio, video and data streams between terminals.

The conventional voice-over-IP system described hereinbefore normally utilizes standard fixed-line telephone systems which are subject to the disadvantages of a lack of mobility.

The WIO concept takes voice-over-IP further in that it provides for the use of conventional mobile terminals, such as GSM mobile stations, within the voice-over-IP system. To provide for such mobile communications within an intra-office communication network, the WIO system combines known voice-over-IP with the use of conventional wireless terminals within the voice-over-IP system. Those telephone units may be GSM mobile stations. This WIO concept may be in the context of a intra-office communication network.

Thus, in the WIO system intra-office calls to mobile stations are routed through the office intranet and external office calls are routed conventionally through the GSM network. Such a system provides most or all of the features supported by the mobile station and the GSM network such as telephone directories, short messaging, multiparty services, data calls, call barring, call forwarding etc. WIO thus provides for integrated voice, video and data communications by interfacing an H.323 based voice-over-IP network with a GSM mobile network.

The WIO system is a cellular network similar to the conventional GSM network and is divided into H.323 zones as discussed hereinbefore. One H.323 zone may comprise a number of a GSM cell. Two or more H.323 zones may be contained with an administrative domain.

Security problems can arise between the office and operator domains of the network. The operator domains of the network are those which are administered by an operator and will typically include the mobile communication supporting components. The office domain typically includes the office intranet and is maintained by the corporation.

It has been recognised by the inventors that H.323 traffic would be rejected by network protection measures, thus preventing cross domain calls to take place.

A second problem with the proposed WIO system arises when there is a call between a fixed H.323 terminal and a mobile station. Currently, if a mobile station moves from being supported by one network element to being supported by another network element, difficulties can arise. In particular, the fixed terminal would need to break its connection with the network element which previously supported the mobile station and establish a new connection with the network element which now supports the mobile station. This is a cumbersome process and data can be lost unnecessarily.

SUMMARY OF THE INVENTION

Accordingly, it is an aim of embodiments of the present invention to address these problems.

According to one aspect of the present invention, there is provided a communications system comprising a first part and a second part, the first and second parts being connected so that a first user in one of the first and second parts can communicate with a second user in the other of the first and second parts, wherein at least said first user is able to move within the respective part of said system, said system further comprising a gateway for permitting communications between said first and second parts, said gateway comprising a register for storing information associating the said first and second users and for storing information relating to the current location of the first user so that information from the second user can be directed to first user.

The gateway thus stores information relating to the current location of the first user. Accordingly, even if the first user is moving, the connection between the second user and the first user can be fixed for the duration of a call and handoff of the first user does not need to be considered by the second user. In preferred embodiments of the present invention, the second user is stationary.

When the location of the first user changes, preferably information relating to the new location is stored in the register of the gateway. Thus, information from the second user can be directed by the gateway to the new location of the first user and vice versa.

The first user may be a mobile terminal which is in communication with a base station. The base station may be coupled to a respective network element and the identity of the network element may be stored in the register as the current location information of the first user. The functions of the base station and the network element may be provided by a single element. In other words, the gateway may direct information from the second user to the network element associated with the first user. The network element may then forward the information from the gateway element to the first user. The network element may be arranged to process the information received from the second user via the gateway so as to be in a format suitable for the first user.

Preferably, an identifier allocated in the network element which is arranged to receive communications intended for the first user is stored in the register. By identifying the port of the respective network element, the first user may be effectively identified as that first user will be exclusively associated with that port.

A gatekeeper element in said first part may be arranged to control the updating of the register and the handover of the first user between base stations and their respective network elements. The gatekeeper element may be defined by the second user as the initial destination during call set-up and the gatekeeper may poll the plurality of network elements in order to determine the location of the first user. The gateway may be transparent during call set-up procedure. In other words, the gateway does not alter the information from the second user as it passes to the gatekeeper. Preferably, after call set-up, information is forwarded directly from the gateway to the respective network element. In other words, information from the gateway is not directed to the respective network element via the gatekeeper.

Preferably, the gateway is arranged to check the source and destination of all information sent between the first and second users in the first and second parts and to permit the information to be passed through said gateway if the source and destination information matches the information stored in the register. The source is of course one of the second and first users and the destination is the other of the first and second users.

The second user may operate in accordance with the H.323 protocol whilst the first user may operate in accordance with the GSM standard or any suitable cellular telecommunications standard.

Preferably, the second user includes information as to the identity of the first user but not the location thereof in information sent to the gateway and said gateway adds the location of the first user from said register to said information from the second user.

According to a second aspect of the present invention, there is provided a gateway for use in a communications system comprising a first part and a second part, the first and second parts being connected so that a first user in one of the first and second parts can communicate with a second user in the other of the first and second parts, wherein at least said first user is able to move within the respective part of said system, said gateway being arranged in use between said first and second parts, said gateway comprising a register for storing information on the identity of said first and second users and for storing information relating to the current location of the first user so that information from the second user can be directed to first user.

According to a third aspect of the present invention, there is provided a communications system comprising a first part and a second part, the first and second parts being connected so that a first user in one of the first and second parts can communicate with a second user in the other of the first and second parts, said system further comprising a gateway element between said first and second parts, said gateway comprising a register for storing information on the identity of said first and second users, wherein said gateway is arranged to check the source and destination of all information sent between the first and second users in said first and second parts and to permit the information to be passed through said gateway if the source and destination information matches the information stored in said register.

BRIEF DESCRIPTION OF THE DRAWINGS

For a better understanding of the present invention and as to how the same may be carried into effect, reference will now be made by way of example only to the accompanying drawings in which:

FIG. 3 shows in detail possible arrangements for the mobility and media gateway and firewall arrangement of FIG. 2.

DETAILED DESCRIPTION OF THE PREFERRED EMBODIMENTS

Figure 1:
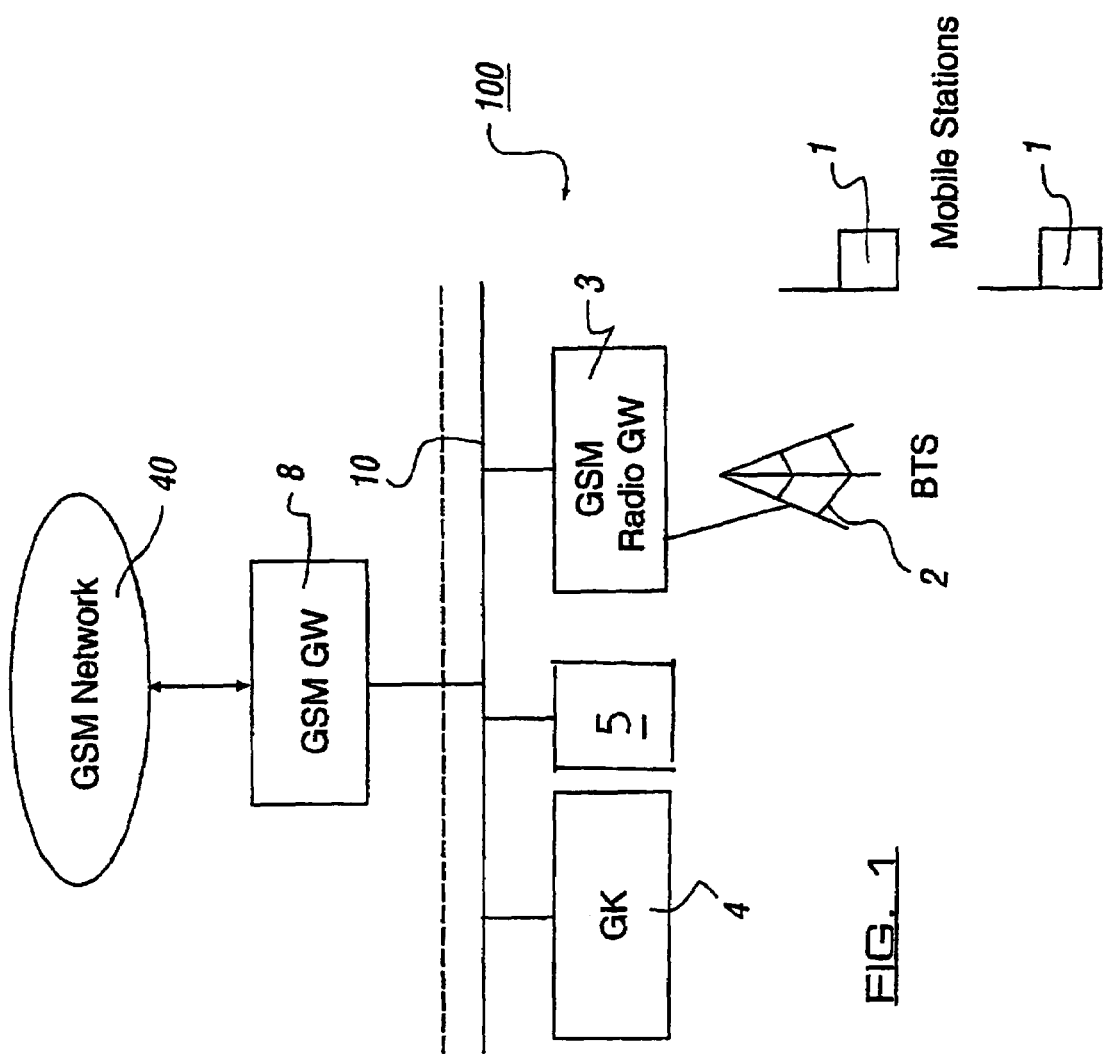
FIG. 1 shows a block diagram showing the components used in the implementation of the WIO system proposed by the applicant.

In the office environment, denoted by the dashed box 100 in FIG. 1, within which the WIO system is implemented, there is an IP (internet protocol) based LAN 10 operable to carry packet form data.

One or more mobile stations (MS) 1 communicate, i.e. transmit signals to and/or receive signals from, a base transceiver station (BTS) 2. The base transceiver station 2 used in the WIO system is similar to the base transceiver stations used in conventional GSM cellular communication systems in that the base station 2 is connected to, and operates in conjunction with, a controller. In a conventional GSM system, the controller is termed a base station controller (BSC). However, in the WIO system, the controller is represented by a GSM radio gateway 3, the function of which will be described hereinafter. The base transceiver station 2 therefore receives signals transmitted by the mobile station 1 and forwards them to the GSM radio gateway 3. The GSM radio gateway 3 is also connected to the LAN 10.

A WIO gatekeeper (WGK) 4 is connected to the LAN 10 as is an H.323 terminal 5. The H.323 terminal 5 may be represented by a computer terminal which may support voice communication.

Connected to the LAN is a GSM gateway 8. The GSM gateway 8 is also connected to a standard GSM network 40 as used in a conventional mobile communication system. The network is sometimes referred to as a public land network. The WIO system allows for the use of mobile telephones in the office environment to make both internal and external office calls. The functions of each of the components of FIG. 1 will now be described in more detail.

The GSM radio gateway 3 performs similar functions to that of a base station controller in a conventional GSM network such as the management of radio resources and channel configuration and the handling of the base transceiver station configuration. However, the GSM radio gateway 3 also provides conversion from GSM voice data to packet based data suitable for transmitting on the packet based LAN 10.

The WIO gatekeeper 4 is the main controller of the WIO system. It is responsible for all of the functions which the H.323 protocol defines to its gatekeeper, including call management, call signalling. It is also responsible for mobility management. The WIO gatekeeper 4 is able to manage the main different call types such as voice, data, facsimile and conference calls which can be established between a mobile station, a PC terminal and a normal telephone in any combination.

The GSM gateway 8 handles communication between the WIO environment and the mobile services switching center (MSC) of the GSM network. From the MSC viewpoint, the WIO appears to be a conventional base station subsystem. The A-intranet gateway 8 also provides isolation means for disconnecting the WIO system from the MSC in the event of WIO system failure.

The telephone calls managed by the WIO system can be divided into internal calls and external calls. Internal calls for those calls where both parties involved in the call are located within the WIO system and external calls involve a user who is not located within the WIO system.

Figure 2:
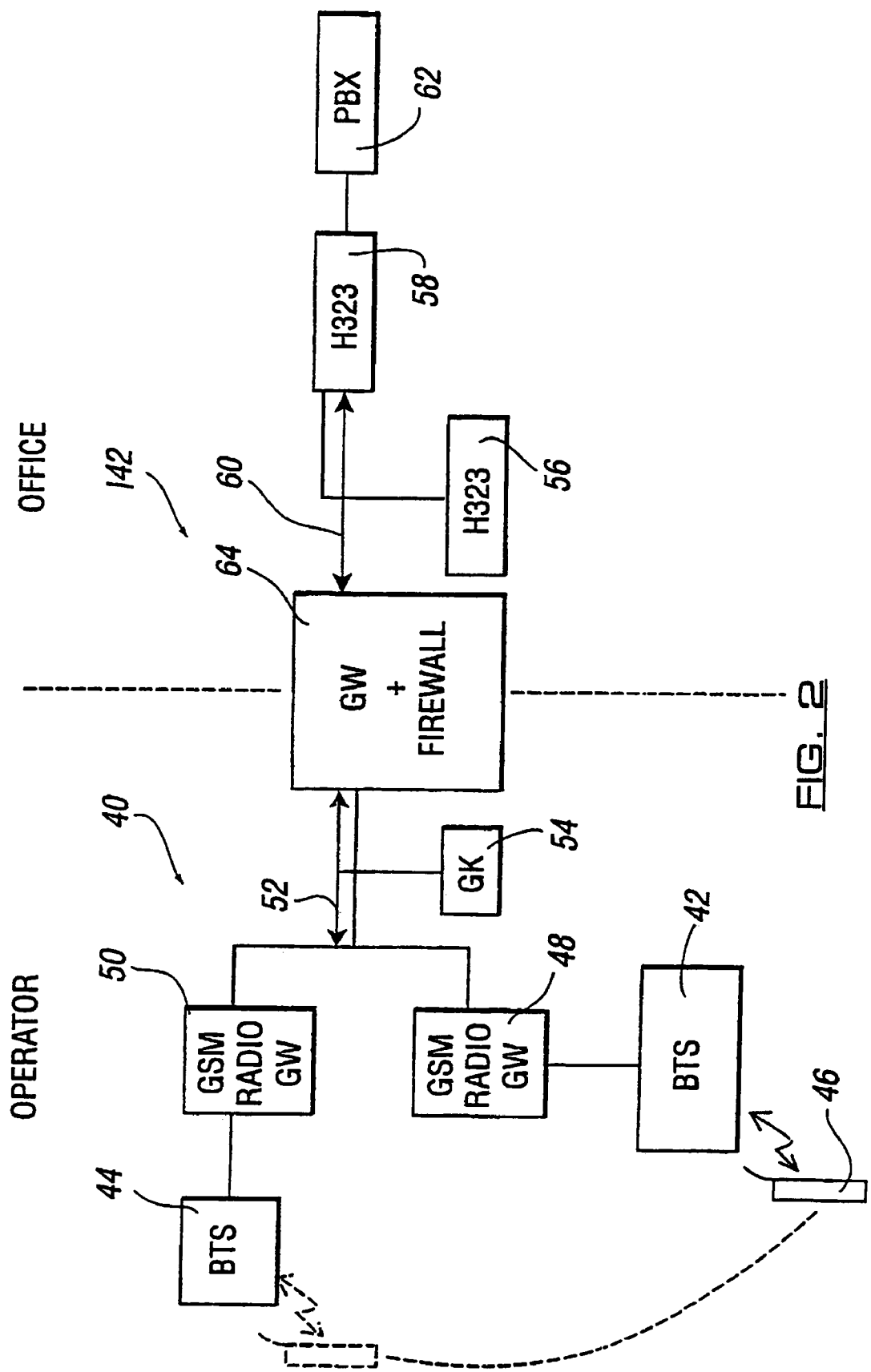
FIG. 2 is a block diagram showing an embodiment of the present invention.

Reference will now be made to FIG. 2 which illustrates an embodiment of the present invention. The office environment 100 illustrated in FIG. 1 may be more complex and be as shown in FIG. 2. The office environment may therefore be divided into two segments or domains. The operator segment 40 is administered by the network operator and can include the mobile communication functions.

In the embodiment shown in FIG. 2, the operator segment 40 has two base stations 42 and 44. Each of these base stations 42 and 44 has its own cell and is able to communicate with the mobile station 46 when the mobile station 46 is in the cell associated with the respective base transceiver station 42 or 44. In practice, more than one mobile station will be present in the operator segment 40. Each of the base transceiver stations 42 and 44 is connected to a respective GSM radio gateway 48 and 50 respectively. The connection between the base transceiver station 42 or 44 and its associated GSM radio gateway 48 or 50 may be via a wired or a wireless connection. Each of the GSM radio gateways 48 and 50 are connected to a LAN 52.

Also connected to the LAN 52 is a gatekeeper 54. The base transceiver stations 42 and 44, GSM radio gateway 48 and 50 and the gatekeeper 54 all provide the same function as those components described in relation to FIG. 1.

The office segment 42 comprises first and second H.323 terminals 56 and 58 respectively. Both of the H.323 terminals can take any suitable form and may, for example, be computer terminals with voice-over-IP capabilities. The H.323 terminals 56 and 58 are connected to a second LAN 60. The second H.323 terminal 58 is coupled to a private branch exchange 62 which may, as in the arrangement shown in FIG. 2, be connected to an external public service telephone network. In the embodiment shown in FIG. 2, either or both of the LANs 52 and 60 will be connected to an external internet.

The embodiment shown in FIG. 2 is arranged to deal with two problems. Firstly, the embodiment shown in FIG. 2 seeks to provide a secure connection between the two segments to avoid undesired access from one segment to another. Secondly, the terminals 56 and 58 in the office segment shown in FIG. 2 are fixed terminals whilst the terminals in the operator segment 40 are mobile stations 46. In particular, the embodiment shown in FIG. 2 aims to deal with the situation which occurs when the mobile station 46 moves from the cell associated with one base transceiver station 42 to the cell of the base transceiver station 44 which is associated with a different intranet mobile cluster interface 50.

Both of these aims are dealt with by the provision of a MMGW mobility and media gateway and firewall arrangement 64. This is shown in more detail in FIG. 3.

Embodiments of the present invention use the IP protocol which works on the basis of addresses and port information which together define a destination.

A "packet filter" type firewall looks at from who (port information) and from where (address information) a packet is sent as well as to whom and where the packet is sent. In other words, it looks for four pieces of information in each data packet; source address, source port, destination address and destination port. Only packets associated with previously defined source and destination addresses and port information are allowed through the firewall.

Application-level proxy firewalls are one which are aware of the application. In this case, this would mean that a firewall knows about WIO and how WIO works. The necessary information is inferred directly from the call set up signalling. Application proxy firewalls read, interpret and modify the content of signalling messages.

Firewalls are effectively invisible to other network elements. Packets pass through the firewalls, but they are never addressed to a firewall. In other words, firewalls observe traffic that is passing between other network elements and lets some packets pass whilst removing others. Either of these two firewalls as well as any other suitable firewall can be used in embodiments of the present invention.

In the present embodiment, packets are explicitly addressed to the media and mobility gateway. The media and mobility gateway will receive the packets, check them, convert the address information and retransmit the packets.

For the media and mobility gateway to operate properly, packets must be addressed to it. As the network has two segments, this means that the mobility and media gateway may have a dual entity. It may have one address that is visible to the first segment and another that is visible to the second segment. These addresses may be the same.

FIG. 3 shows various different ways in which the firewall and mobility and media gateway arrangement can be implemented in practice.

FIG. 3a shows the second segment 142 being protected by using a firewall 80 and a single mobility and media gateway 82 in the second segment. In this case, the media and mobility gateway 82 is part of the second segment and has a single identity. The firewall 80, which is also part of the second segment is configured to pass traffic to and receive traffic from the mobility and media gateway 82. It should be appreciated that the data to be sent to the first segment 40 from the second segment 142 must pass through the firewall 80 first.

FIG. 3b shows a second arrangement. In this arrangement, the firewall 80 and the mobility and media gateway 82 of the first arrangement are provided. Additionally, a second firewall 84 is provided in the first segment 40. Both firewalls 80 and 84 are configured to pass data to and receive data from the mobile and media gateway 82.

A third arrangement is shown in FIG. 3c. A firewall 84 is provided in the first segment 40 whilst the mobility and media gateway 82 is provided in the second segment 142. There is no firewall in the second segment 142. The firewall 84 is again configured to pass all data to and from the mobility and media gateway 52.

In the fourth arrangement, no firewall is used. The mobility and media gateway 82 is only provided in the second segment 142. The fifth arrangement shown in FIG. 3e is similar to that shown in FIG. 3d. However, the mobility and media gateway 82 is instead only provided in the first segment 40.

In the sixth arrangement, which is used in preferred embodiments of the present invention, the mobility and media gateway 82 is effectively provided in each of the segments 40 and 142. It will therefore have a dual identity, one for each segment. Since the mobility and media gateway 82 has a dual identity, it belongs to both of the segments and hence no intersegment traffic occurs. Rather, the mobility and media gateway 82 tunnels the data between the segments. The use of a firewall can de dispensed with. The mobility and media gateway 82 can be configured in any suitable manner so that the mobility and media gateway 82 is trusted entity by both segments 40 and 142. In other words, the function of the firewalls can be provided by the mobility and media gateway 82.

The call set up procedure will now be described. It is assumed that one of the H.323 terminals 56 and 58 is calling a mobile station 46 in the first segment 40. It is assumed that the sixth arrangement shown in FIG. 3f is present. The mobility and media gateway 82 has a dual identity where address 1 is the mobility media gateway identity in the first segment and address 2 is the identity of the mobility media gateway 82 in the second segment 42. The H.323 terminal 56 sends the call set up message to the gatekeeper 54. If there are firewalls present, they can be configured to pass this message through, as the gatekeeper's port number for call signalling is well known to the firewall.

The gatekeeper 54 receives a set up message and notes that the requested destination is a mobile station 46 and that it therefore needs to be polled. The gatekeeper 54 then commences a paging procedure. Whilst paging is carried out, the gatekeeper 54 requests that the mobility and media gateway 82 reserve a port number. The mobility and media gateway 82 selects a port number and replies to the gatekeeper 54. The paging ends with the GSM radio gateway 48 currently serving the mobile station 46 sending a paging response message. The gatekeeper 54 knows the gateway address that serves the mobile station 46 from this message. The gatekeeper 54 will thus know where to send the call set up information. It will include in the call set up information the port and address information of the mobility and media gateway 82 which has been reserved. This is in order to instruct the GSM radio gateway 48 to direct the call data flow correctly.

The GSM radio gateway 48 receives the call set up message and will reserve a port number for this call. The GSM radio gateway 48 confirms the call by sending a message to the gatekeeper 54 detailing the port number it has selected.

The gatekeeper 54 now needs to create an association with the mobility and media gateway 82. One port has been already reserved which is intended to receive data from the mobile station sent by the GSM radio gateway 48. It also needs to tell the mobility and media gateway 82 where the mobility and media gateway is to send data which has been received from the H.323 terminal 56. Finally, the gatekeeper 54 also needs to provide an indication for the mobility and media gateway 82 to realise that the information is related to a single call. In other words, an association is created between the call, the information and resources (source and destination addresses and port numbers) reserved for the call. It therefore sends a configuration message to the media and mobility gateway that includes:

a) source and destination addresses and ports in order to associate them together and in order to advise the mobility and media gateway 82 about the destination information; and b) the already reserved port information so that the mobility and media gateway 82 can relate this new information with the previously allocated resources.

The mobility and media gateway 82 creates the association by storing the information in its register. It will now select a free port on the H.323 terminal side.

The mobility and media gateway 82 responds to the gatekeeper 54 with the newly allocated port number. The gatekeeper sends a call confirmation message towards the H.323 terminal including the mobility and media gateway address and port number in that segment. This is in order to tell the H.323 terminal where to send the data.

The call can now be commenced. The processing of the speech packets will now be described. The H.323 terminal 56 has speech data which it wishes to send to the mobile station 46. It sends the speech data to the mobility and media gateway address and port it is received as part of the call set up procedure. As the mobility and media gateway receives the data, it will check that the source address and port match the port where the data was received. If so, the mobility and media gateway 82 will forward the data towards the GSM radio gateway 48 that serves the mobile station, using the data it receives during call set up.

The GSM radio gateway 48 in turn has some data which it wishes to send to the H.323 terminal from the mobile station. It will transmit the data to the mobility and media gateway 82 using the identity of the mobility and media gateway that is visible to it. The mobility and media gateway will again check the information. If the data on the receiving port matches the expected sender, it will forward the data to the H.323 terminal. Otherwise, the data will be discarded.

If the mobile station moves from the cell associated with one of the base stations 42 to the cell associated with another of the base stations 44, handoff will be required. The GSM radio gateway 48 currently serving the mobile station will decide when handoff is required. It will then inform the gatekeeper 54. The gatekeeper 54 sends a handoff request to the new GSM radio gateway 50. The target GSM radio gateway selects the port that it will use to receive the speech data. This information is forwarded to the gatekeeper, handoff is then executed. Once an indication of successful handoff is received, the existing association in the mobility and media gateway 82 is updated with the new information.

The mobility and media gateway may process call signalling particularly if it is configured as shown in FIG. 3f. Consider the following situation.

A H.323 terminal 56 must use the RAS (registration, admission and status) signalling prior to sending a call setup request in order to get admission from the gatekeeper 54 to use the network. With the admission request, the H.323 terminal 56 sends its own port number where it wishes to receive the signalling messages. The message is sent towards the well known port of the mobility and media gateway 82, which will relay the message to the gatekeeper 54.

The mobility and media gateway 82 receives the message at its well known port. It will read and store the port information of the H.323 terminal 56 and replace the information with its own data, and forward the data towards the gatekeeper 54. The gatekeeper 54 receives the message, and selects a port, and replies to the message.

The mobility and media gateway 82 will again store the gatekeeper's port number, allocate a new port number for the H.323 terminal and send the message forward. Having received a admission configuration from the gatekeeper 54, the H.323 terminal 56 now sends the call setup request.

Eventually the call setup request reaches the GSM radio gateway 48 which will also make a request for admission prior to accepting the call set-up request. This time, the mobility and media gateway 82 is not involved and the allocation of ports is more straightforward.

Another way of carrying out this function would be to bundle these transactions into the call setup messages.

If a firewall is included such as shown in FIGS. 3a to 3c, and the mobility and media gateway 68 does process signalling as well, then the allocation of speech ports can be modified to be more straightforward. This is described hereinafter.

The H.323 terminal 56 sends the call setup request towards the mobility and media gateway 82, which "acts" like the gatekeeper 54.

The mobility and media gateway 82 will read the port information and replace it with it's own information. The read data is stored in the register in the mobility and media gateway 82. The mobility and media gateway 82 forwards the data towards the gatekeeper 54.

The gatekeeper does the normal polling (or paging) to find the mobile station 46. Once the mobile station 46 has been found, the gatekeeper 54 forwards the setup message towards the GSM radio gateway 48.

When the call is confirmed, the GSM radio gateway 48 sends the message through the gatekeeper 54 to the mobility and media gateway 82. The gatekeeper 54 uses the mobility and media gateway port information it received in the setup message when forwarding the message to the mobility and media gateway 82.

The mobility and media gateway will read the GSM radio gateway port information from the confirmation message and storage it in its register. The mobility and media gateway 82 will allocate a new port information for the speech stream that is coming from the H.323 terminal 56. Then the mobility and media gateway 82 replaces the port information and forwards the confirmation message towards the H.323 terminal 56.

When the terminal receives the confirmation message, it will learn the port number where it will send the data as described hereinbefore.

The mobility and media gateway can carry out other functions. For example, as part of the call setup, the end points may specify how much bandwidth is going to be used for the transactions. The security of the mobility and media gateway can be enhanced by adding functionality that monitors the actual bandwidth used by the end points during the call. If it is significantly different from what was specified, the mobility and media gateway may close the call. In other words, the mobility and media gateway can use other data which it learns as part of the call setup procedure to assist in maintaining a secure system.

Whilst the embodiment of the present invention has been described in the context of a system which uses the GSM standard, it should be appreciated that any other mobile cellular system can also be used in embodiments with the present invention. Likewise, the system has been described as using the H.323 protocol and the associated protocols. However, any other suitable protocol can of course also be used in embodiments of the present invention. It should also be appreciated that in embodiments of the present invention, both users in the two different segments may be mobile users.

The invention claimed is:

1. A communications system, comprising:
a network having a first part and a second part, the first and second parts being connected so that a first user in one of the first and second parts can communicate with a second user in the other of the first and second parts, wherein at least the first user is able to move within the respective part of the communication system;
a gateway for permitting communications between the first and second parts, the gateway comprising a register for storing information associating the first and second users and for storing information relating to the current location of the first user so that information from the second user can be directed to first user, wherein the first user is a mobile terminal which is in communication with a base station which is coupled to a respective network element and information relating to the identity of the network element stored in the register as the current location information of the first user; and
an identifier, allocated in the network element which receives communications intended for the first user, is stored in the register.

2. The communications system as claimed in claim 1, wherein when the location of the first user changes, the gateway further stores information relating to the new location in the register of the gateway.

3. The communications system as claimed in claim 1, wherein a gatekeeper element controls the updating of the register and the handover of the first user between base stations and their respective network elements.

4. The communications system as claimed in claim 3, wherein the gatekeeper element is defined by the second user as the initial destination during call setup and the gatekeeper polls a plurality of network elements to determine the location of the first user.

5. The communications system as claimed in claim 4, wherein the gateway is transparent during call set-up procedure.

6. The communications system as claimed in claim 4, wherein after call set-up, information is forwarded directly from the gateway to the respective network element.

7. The communications system as claimed in claim 5 wherein the gateway controls the updating of the register.

8. The communications system as claimed in claim 1, wherein the system uses the internet protocol.

9. The communications system as claimed in claim 1, wherein the register stores source and destination ports and addresses.

10. The communications system as claimed in claim 9, wherein at least one of the source and destination addresses and ports are of the first and second user.

11. The communications system as claimed in claim 9, wherein at least one of the source and destination addresses and ports are of an intermediate network element between the gateway and a user.

12. The communications system as claimed in claim 1, wherein the gateway checks the source and destination of all information sent between the first and second users in the first and second parts and to permit the information to be passed through gateway if the source and destination information matches the information stored in the register.

13. The communications system as claimed in claim 1, wherein the second user is a fixed user.

14. The communications system as claimed in claim 1, wherein the second user operates in accordance with the H.323 protocol.

15. The communications system as claimed in claim 1, wherein the first user operates in accordance with the GSM standard.

16. A gateway for use in a communications system, comprising:
   a network comprising a first part and a second part, the first and second parts being connected so that a first user in one of the first and second parts can communicate with a second user in the other of the first and second parts, wherein at least the first user is able to move within the respective part of the system; and
   a gateway being positioned between the first and second parts, the gateway comprising a register for storing information associating the first and second users and for storing information relating to the current location of the first user so that information from the second user can be directed to first user, wherein the first user is a mobile terminal in communication with a base station coupled to a respective network elements and information relating to the identity of the network element is stored in the register as the current location information of the first user and an identifier, allocated in the network element which receives communications intended for the first user, is stored in the register.

17. A communication system, comprising:
   a network comprising a first part and a second part, the first and second parts being connected so that a first user in one of the first and second parts can communicate with a second user in the other of the first and second parts; and
   a gateway element positioned between the first and second parts, the gateway comprising a register for storing information associating the first and second users, wherein the gateway checks the source and destination of all information sent between the first and second users in the first and second parts and to permit the information to be passed through the gateway if the source and destination information matches the information stored in the register, wherein the first user comprises a mobile terminal in communication with a base station coupled to a respective network element, and wherein information relating to the identity of the network element is stored in the register as the current location information of the first user and an identifier, allocated in the network element which receives communications intended for the first user, is stored in the register.

18. A communications system, comprising:
   a subsystem connected to a network, the network having a first part and a second part, the first and second parts being connected so that a first user in one of the first and second parts can communicate with a second user in the other of the first and second parts, wherein at least the first user is able to move within the respective part of the system;
   a gateway for permitting communications between the first and second parts, the gateway comprising a register for storing information associating the first and second users and for storing information relating to the current location of the first user so that information from the second user can be directed to first user, wherein the first user is a mobile terminal which is in communication with a base station which is coupled to a respective network element and information relating to the identity of the network element is stored in the register as the current location information of the first user and an identifier, allocated in the network element which receives communications intended for the first user, is stored in the register; and
   a gatekeeper element controls the updating of the register and the handover of the first user between base stations and their respective network elements and the gatekeeper element is defined by the second user as the initial destination during call setup and the gatekeeper is further configured to poll a plurality of network elements to determine the location of the first user.

19. A communications system, comprising:
   network means for networking, comprising a first part and a second part, the first and second parts being connected so that a first user in one of the first and second parts can communicate with a second user in the other of the first and second parts, wherein at least the first user is able to move within the respective part of the communication system;
   permitting means for permitting communications between the first and second parts, the permitting means comprising a register for storing information associating the first and second users and for storing information relating to the current location of the first user so that information from the second user can be directed to first user, wherein the first user is a mobile terminal which is in communication with a base station which is coupled to a respective network element and information relating to the identity of the network element stored in the register as the current location information of the first user; and
   receiving means for receiving communications intended for the first user stored in the register.

* * * * *